United States Patent
Yasinover et al.

(10) Patent No.: US 9,539,828 B2
(45) Date of Patent: Jan. 10, 2017

(54) IMAGE LAYOUT

(71) Applicant: Hewlett-Packard Indigo, B.V., Amstelveen (NL)

(72) Inventors: David Yasinover, Ness Ziona (IL); Ilan Meiri, Ness Ziona (IL); Itzik Kent, Ness Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 14/900,025

(22) PCT Filed: Jun. 28, 2013

(86) PCT No.: PCT/EP2013/063695
§ 371 (c)(1),
(2) Date: Dec. 18, 2015

(87) PCT Pub. No.: WO2014/206496
PCT Pub. Date: Dec. 31, 2014

(65) Prior Publication Data
US 2016/0144638 A1     May 26, 2016

(51) Int. Cl.
*B41J 11/66* (2006.01)
*H04N 1/00* (2006.01)
(Continued)

(52) U.S. Cl.
CPC .............. *B41J 11/663* (2013.01); *B41F 13/58* (2013.01); *B41F 13/60* (2013.01); *B41F 33/00* (2013.01);
(Continued)

(58) Field of Classification Search
CPC ......... B41J 11/663; B41J 11/666; B41J 11/68; B41J 11/70; B41J 11/703; B41J 11/706; B41J 15/00; B65H 2511/10; B65H 2301/1421; H04N 1/00132; H04N 1/00143; H04N 1/00204; H04N 1/00453; H04N 1/00456; H04N 1/00676; G03D 15/005

See application file for complete search history.

(56) References Cited

U.S. PATENT DOCUMENTS 5,360,161 A    11/1994   Schaller et al.
6,362,900 B1 *   3/2002   Squilla ............... H04N 1/00132
                                                                    283/67

(Continued)

FOREIGN PATENT DOCUMENTS

JP           11105353       4/1999

OTHER PUBLICATIONS

Theopistos, "Selecting Borders or Adding Your Own Margins", Nov. 18, 2011. http://finerworks.com/theo/blog/an-artists-guide-to-digital-printing/selecting-borders-or-adding-your-own-margins/.

*Primary Examiner* — Anh T. N. Vo
(74) *Attorney, Agent, or Firm* — HP Inc. Patent Department

(57) ABSTRACT

According to an example, a printing system may include a web layout module to access a set of images and generate a web layout of the set of images, in which the web layout is arranged in columns of same sized images, each column being arranged in sorted order of image size. The module may further add at least one of advertising material, a coupon, and customer information on a space of a column on which images do not extend a width of the web layout. The printing system may also include a print engine to print the set of images and the at least one of the advertising material, coupon, and customer information on a web of substrate in the generated print layout.

15 Claims, 8 Drawing Sheets

(51) Int. Cl.

| | | |
|---|---|---|
| *B41F 33/00* | (2006.01) |
| *B41F 13/58* | (2006.01) |
| *B41F 13/60* | (2006.01) |
| *G03G 15/36* | (2006.01) |
| *B41J 11/68* | (2006.01) |
| *B41J 11/70* | (2006.01) |
| *B41J 15/04* | (2006.01) |
| *B41J 15/00* | (2006.01) |

(52) U.S. Cl.
CPC ............ *B41F 33/0009* (2013.01); *B41J 11/68* (2013.01); *B41J 11/70* (2013.01); *B41J 15/00* (2013.01); *B41J 15/04* (2013.01); *G03G 15/36* (2013.01); *H04N 1/00132* (2013.01); *H04N 1/00453* (2013.01); *G03G 2215/00814* (2013.01)

(56) References Cited

U.S. PATENT DOCUMENTS

| | | | |
|---|---|---|---|
| 6,381,033 B1 | 4/2002 | Morba et al. | |
| 6,452,663 B1 | 9/2002 | Robinson et al. | |
| 6,536,892 B1* | 3/2003 | Chang | B41J 11/008 347/101 |
| 6,598,953 B2* | 7/2003 | Bland | B41J 11/46 347/19 |
| 6,727,909 B1* | 4/2004 | Matsumura | G06T 11/60 345/629 |
| 7,016,059 B1* | 3/2006 | Baum | G03D 15/005 358/1.15 |
| 7,031,005 B1* | 4/2006 | Nakanishi | H04N 1/00453 358/1.15 |
| 8,437,575 B2* | 5/2013 | Chen | H04N 1/00132 382/284 |
| 2010/0221056 A1 | 9/2010 | Shirotori et al. | |

\* cited by examiner

IMAGE LAYOUT

CLAIM FOR PRIORITY

The present application is a national stage filing under 35 U.S.C. §371 of PCT application number PCT/EP2013/063695, having an international filing date of Jun. 28, 2013, the disclosure of which is hereby incorporated by reference in its entirety.

BACKGROUND

In web-based printing production environments the production of different size prints for a single client can lead to complex and inefficient workflows. For example, printing production environments are generally configured such that different physical printers are used to produce prints of different sizes on separate webs of substrate. Each printing system typically has its own associated cutting equipment to separate each individual print from each web.

Collating a client's prints from multiple printers requires manual intervention or complex and expensive mechanical substrate handling systems.

BRIEF DESCRIPTION

Examples, or embodiments, of the invention will now be described, by way of non-limiting example only, with reference to the accompanying drawings, in which.

DETAILED DESCRIPTION

In some printing production environments customer orders may include content to be printed of differing sizes. Content may include images, photographs, documents, or the like. For convenience herein, however, the term 'image' is used generally to cover, as appropriate, any suitable type of content to be printed or suitable type of printed content.

Figure 1:
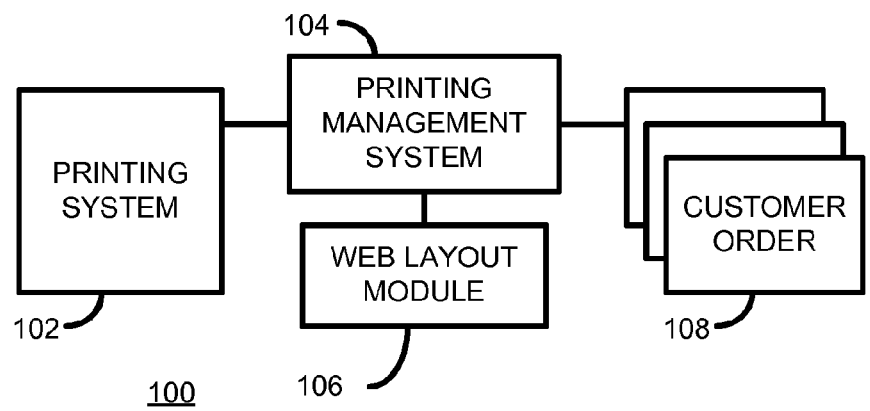
FIG. 1 shows an illustrative block diagram of a printing production environment according to one example.

FIG. 1 shows an illustrative block diagram of a printing production environment 100 according to one example. The printing production environment 100 includes a printing system 102 for generating printed images. In one example the printing system 102 is a printing system that prints on rolls or webs of substrate.

The printing system 102 may in some examples include one or multiple finishing modules (not shown) for performing post-processing operations on printed images generated by the printing system. Example finishing modules include cutters, laminators, and stackers. In one example the printing production environment 100 comprises multiple printing systems 102.

The printing production environment 100 further comprises a printing management system 104 to manage the production of printed images in accordance with customer orders 108, and to generally control the printing system 102. The printing production environment 100 further includes a web layout module 106 to determine the manner in which images of a customer order are to be printed on a web such that the images are arranged and printed in an efficient layout, as will be described further below.

Figure 2:
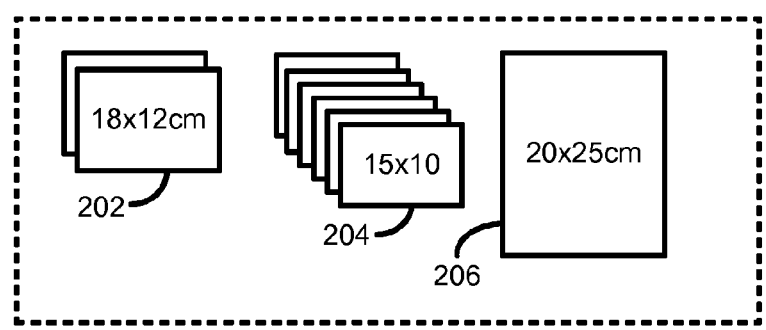
FIG. 2 illustrates one example of a customer order having a number of images having different print sizes.

FIG. 2 illustrates one example of a customer order 200 comprising a set of images. The set of images has a number of images having a first print size 202, a number of images having a second print size 204, and a number of images (in the present example just a single image is shown) having a third print size 206. In other examples a customer order may include a greater or lesser number of images having different print sizes.

A customer order may be submitted to a printing production environment in a number of different ways. For example, a print shop may provide a web interface through which a customer may upload images to be included in the customer order and also to specify a print size for each of the images to be printed. In other examples images and associated print size information may be provided to a print shop via email, via a memory or storage device, or in any other suitable manner.

In one example, the web layout module 106 processes the images of each customer order such that the images of a single customer order are printed together in an efficient layout on a web. Depending on the characteristics of the printing systems included in the environment 100 restrictions as to the maximum print size of images that may be included in a customer order may apply. For example, the width of web a printing system is capable of printing on may limit a maximum dimension of an image print size.

As will be described further below, such a layout enables images having different print sizes to be printed on a single web, rather than having images of different print sizes being printed by different printing systems as is conventionally done. One major advantage of printing all images of a customer order together and on the same printing system is that it eliminates problems of color matching between different printing systems, ensuring color consistency between all printed images of a customer order.

Furthermore, in one example described below, such a layout enables each printed image to be separated from the web using only a pair of web cutters.

Yet furthermore, in one example described below, such a layout enables all printed images of a customer order to be easily collated, in print size order, ready for packaging and dispatch to a customer. As will become clear from the description below, such a system enables significant efficiencies to be made within a printing production environment.

Figure 3:
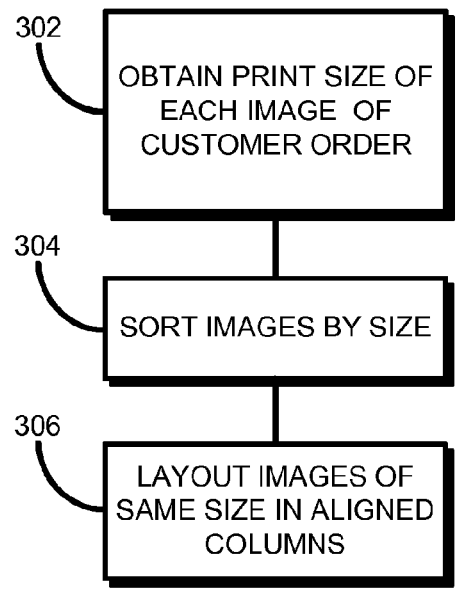
FIG. 3 shows a flow diagram outlining a method performed by a web layout module according to one example.

Referring now to FIG. 3 there is shown a flow diagram outlining a method performed by the web layout module 106 according to one example.

At block 302, the web layout module 106 obtains the print size defined for each image in a customer order. For photographic images the print size that each image is to be printed at may be different from the display or pixel size defined in an image file. In such cases an up or down scaling of image data may have to be performed when the image is printed. For documents, the print size may be defined in terms of standard paper sizes, such as A4, A3, etc., or in terms of an absolute size, such as using a width and height dimension.

At block 304 the web layout module 106 sorts the images of the customer order by print size. In one example images which have the same print size, but in which the size dimensions are inversed (such as an image having a print size of 15 cm×10 cm and image having a print size of 10 cm×15 cm) are treated as images of the same print size.

At block 306 the web layout module 106 determines a web layout, or arrangement, of how the images will be arranged to be printed on a web. In one example the web layout module 106 arranges images of the same print size (aligned in the same orientation) in aligned columns. By aligned is meant that the edges of each column are in the same linear alignment. In one example each column is aligned perpendicular to the direction of web advance, although in other examples each column may be aligned at an oblique angle to the direction of web advance.

The number of images that may be included in each column is determined based on the web width and the print size of each image. Each image in each column may be considered as being in a column row. Where a customer order includes more images of a given size than will fit in a single column multiple columns may be used. Depending on the image orientation some images may need to be rotated by 90 degrees for them to fit in a column.

Any space in a column that is not filled by an image may be used for other purposes, to avoid web waste. For example, If a column can hold three images of a given size, but only two images are to be included in that column the remaining space may be used to print advertising material, coupons, customer information, or any other appropriate content provided by the operator of the printing production environment 100.

In one example the web layout module 106 arranges the images in the web layout by descending print size order, such that the largest images will be printed first, and the smallest images will be printed last. In another example the web layout module 106 arranges the images in the web layout by ascending print size order, such that the smallest images will be printed first, and the largest images will be printed last. In one example the web layout module 106 groups of images of the same print size together, but does not provided a layout sorted by size.

Figure 4:
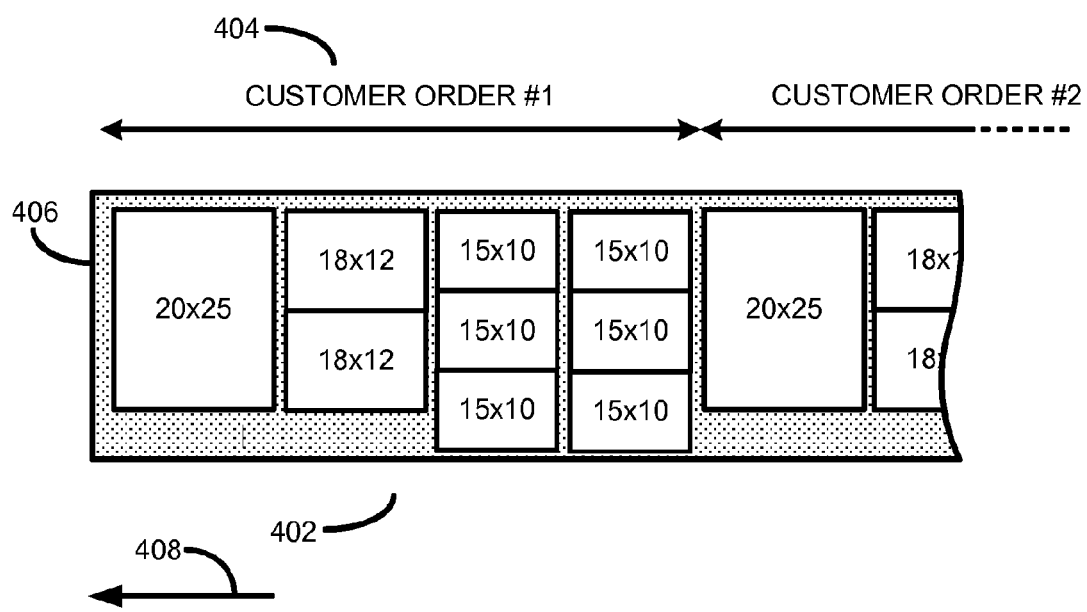
FIG. 4 is shows an example image layout according to one example.

An example web layout as generated by the web layout module 106 is shown in FIG. 4. A number of images 402 of a customer order 404 are shown arranged on a web 406 such that when printed the images are printed by print size order from largest to smallest, with images having the same print size being included in one or multiple columns of aligned images. The direction of web advance is shown by arrow 408. Hence, in the example shown images shown at the left-hand edge of the web 406 are printed prior to images shown on the right-hand edge of the web 406.

It can be seen in FIG. 4 that images of the same print size are arranged in vertically aligned columns of images having the same print size and same orientation. Each column of images is arranged such that all images in the column have their lateral edges aligned with the other images in the column.

The orientation of the images in each column may be chosen to make efficient use of the web width thereby reducing web waste. For example, depending on the web width and print size, one column may orient images in a portrait orientation (i.e. the shorter dimension parallel with the web length) or in a landscape orientation (i.e. the longer dimension parallel with the web length).

In one example each image is arranged such that there is no blank space between columns of images or images within each column, thereby reducing the amount of web which is wasted. By arranging images in this manner significant web waste reductions may be achieved.

In some examples, however, each image may be arranged such that there is a blank space between each image. In one example blank spaces are included above and below each image in each column, in another example blank spaces are included between columns of images, and in another example blank spaces are included both between images in each column and between columns.

The purpose of laying out the images in the manner described above is to facilitate handling of the images in a printing production environment, and in particular to facilitate the separation of each individual printed image from a continuous web.

Figure 5:
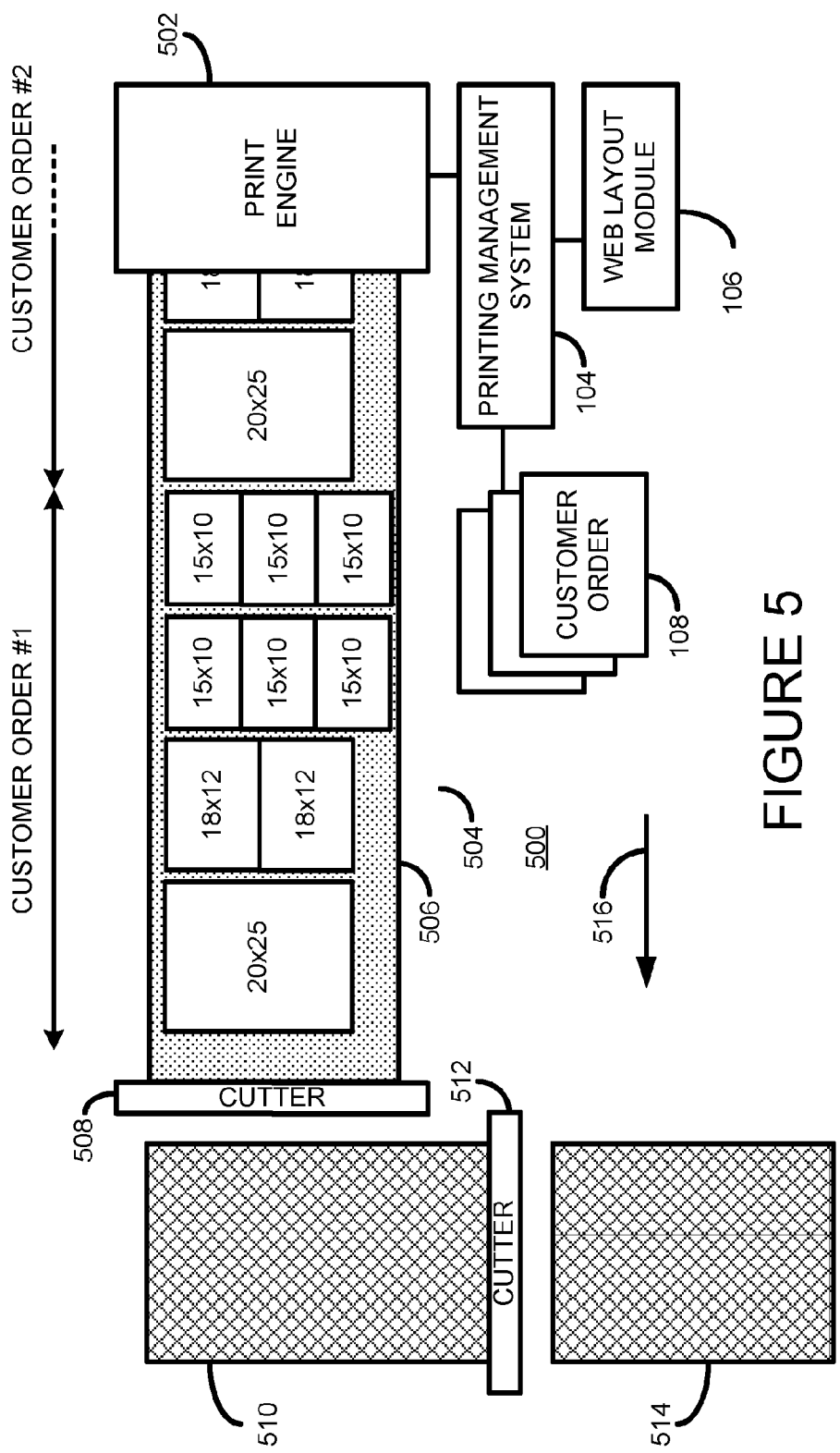
FIG. 5 shows a simplified illustration of a printing production environment according to one example.

Referring now to FIG. 5 there is shown a simplified illustration of a printing production environment 500 according to one example.

A printing engine 502 is provided for printing images of a customer order 108 on a web of substrate 506. The printing engine 502 may be any suitable printing engine including an inkjet printing engine, a liquid electro-photographic (LEP) printing engine, a dry laser toner printing engine, or the like. The web 506 is advanced in a web advance direction 516 by a suitable web transport mechanism (not shown).

As described above the web layout module 106 determines an efficient layout in which the images of a customer order are printed on a web. Under control of the printing management system 104 the print engine 502 prints images of each customer order in the determined layout.

The printing production environment 500 includes a first web cutter 508 for cutting across the width of the web 506 to separate each column of printed images from the web 506.

A second cutter 512 is provided to separate each individual printed image from each separated column of images.

The cutters may be any suitable kind of cutter, such as a rotary cross-cutter, a guillotine cutter, a shear cutter, and the like. The cutters may also include waste removal systems to enable cut waste media to be collected for disposal.

In the example shown, where columns of images are arranged perpendicular to the web advance direction, the first cutter 508 is oriented perpendicular to the web advance direction 516, and the second cutter 512 is orientated perpendicular to the first cutter.

In examples where columns of images are aligned at an oblique angle to the web advance direction the first cutter is aligned parallel to each printed column, and the second cutter is aligned perpendicular to the first cutter.

A transport mechanism 510 is also provided to transport separated columns of images cut by the first cutter 508 to the second cutter 512. The transport mechanism may be any suitable transport mechanism such as a conveyer belt, a vacuum belt, a slider, or the like.

In another example the second cutter may have a non-perpendicular orientation with respect to the first cutter 508, in which case the transport mechanism 510 may additionally rotate a separated column of images cut by the first cutter 508 such that the base of each image in each column is aligned parallel with the second cutter 512 such that the second cutter 512 may separate individual images from each separated column.

Figure 6:
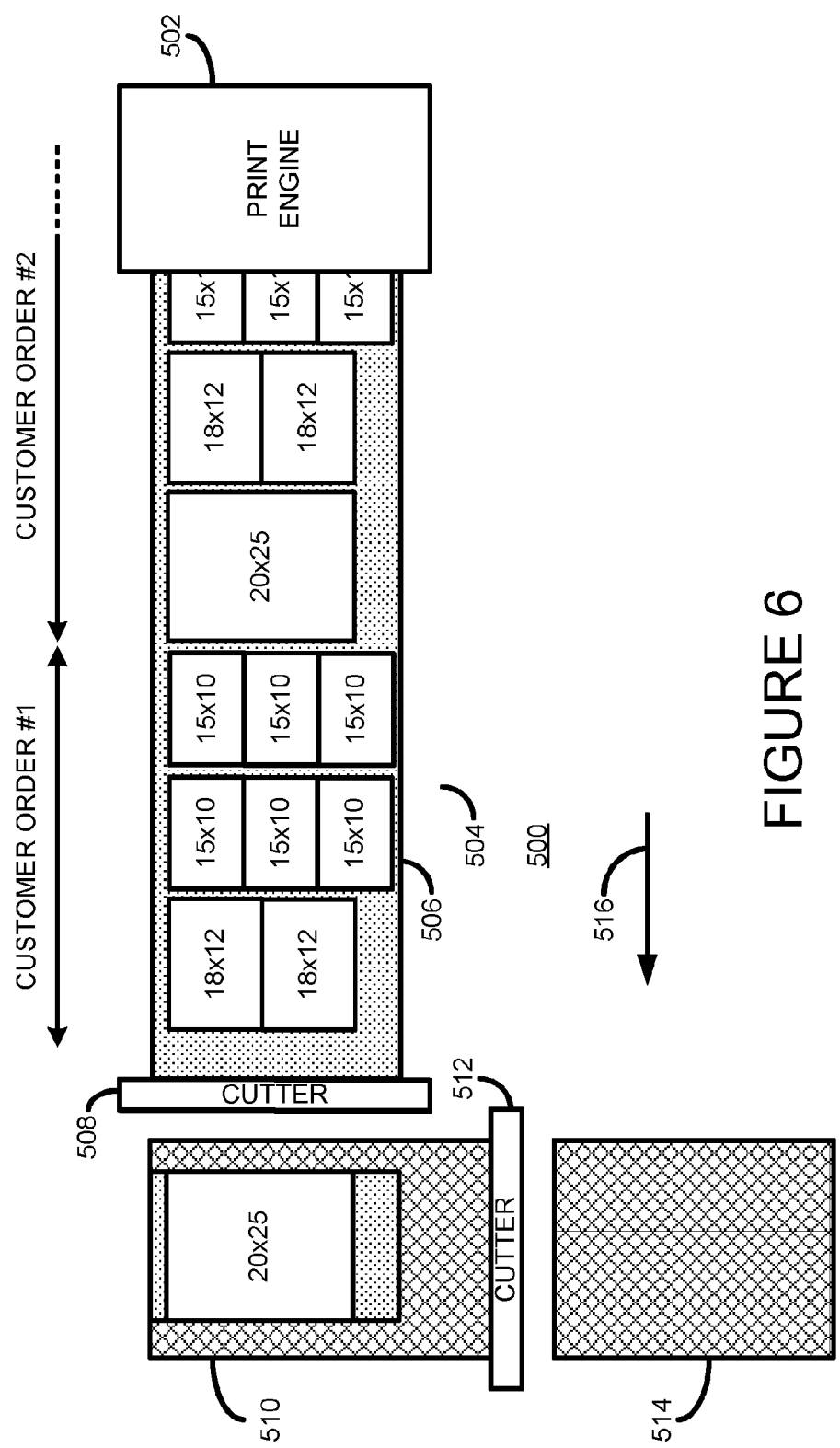
FIG. 6 shows a simplified illustration of a printing production environment according to one example.

As illustrated in FIG. 5, the images of a first customer order have been printed on the web 506. As the web 506 advances in the web advance direction 516 the first cutter 508 separates the first column of images (in this case only a single 20×25 cm image) using a first cut to trim a first edge of the column of images and a second cut to trim a second edge of the column of images. The cut column of images is then moved to the transport mechanism 510 for transport to the second cutter 512, as shown in FIG. 6.

Figure 7:
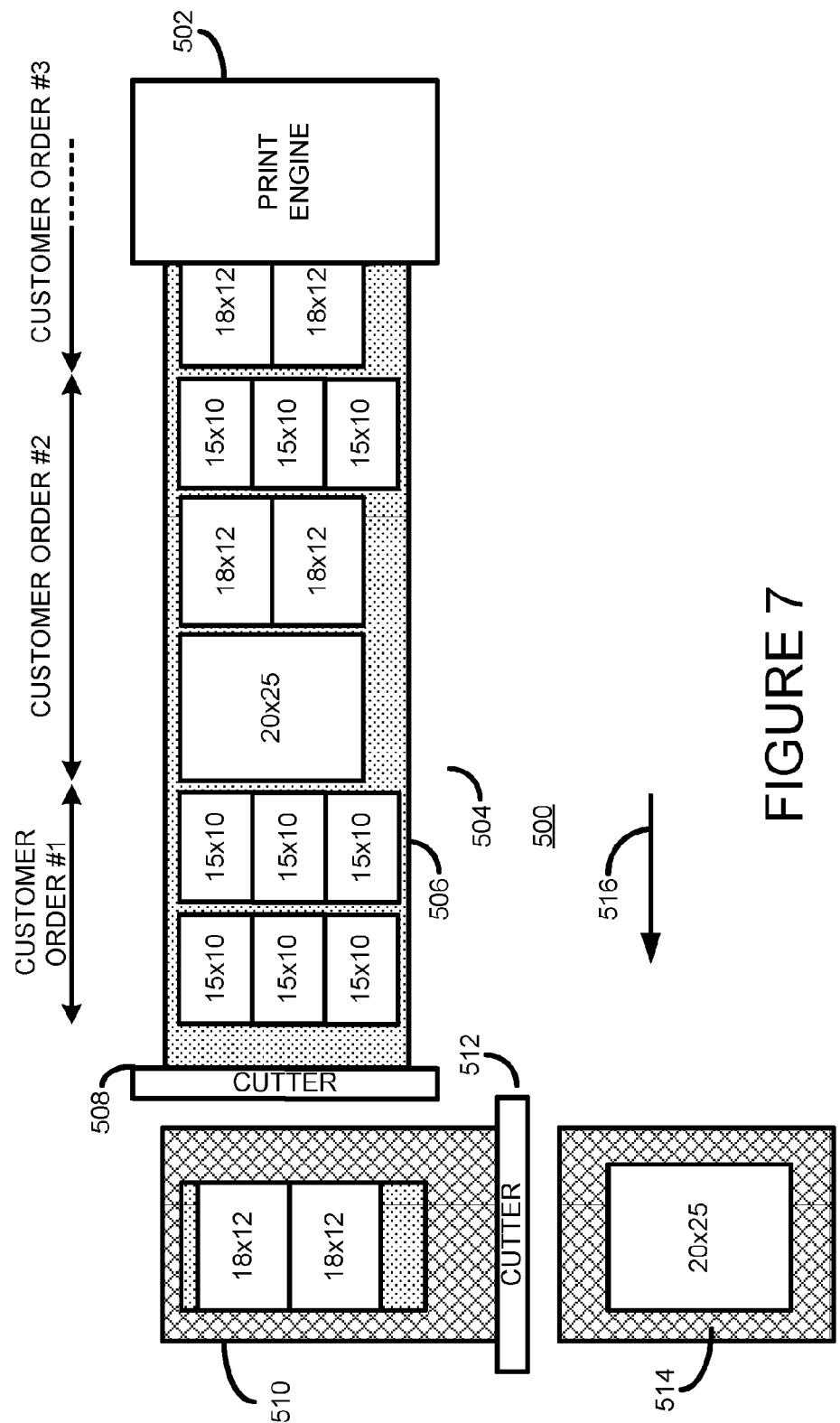
FIG. 7 shows a simplified illustration of a printing production environment according to one example.

As illustrated in FIG. 7, the transport mechanism 510 transports the first column of images (in this case containing only a single image) to the second cutter 512. The second cutter in this case makes a first cut to remove web waste from the bottom of the image, and makes a second cut to remove waste web from the top of the image. The fully trimmed image is collected in a stacking area or a stacker module 514.

The first cutter also separates the subsequent printed column of images (in this case a pair of 18×12 cm images) from the web 506 using one cut on either side of the column of images.

Figure 8:
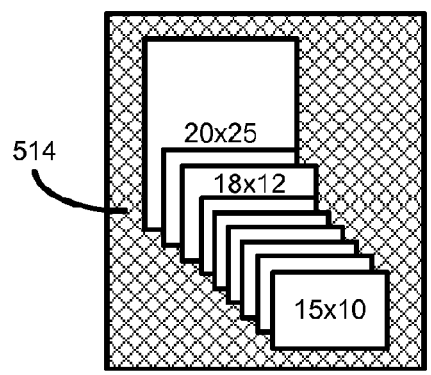
FIG. 8 shows an example of collated images according to one example.

The process continues with each of the fully trimmed images being collected in the stacker area or stacker module 514, as illustrated in FIG. 8.

In one example, to control the first cutter to precisely cut each column of images from the web 506 and to control the second cutter to precisely cut each image from each column of images the printing management system 104 additionally causes the print engine 502 to print cutter control marks or cutter control data on the web 506.

Figure 9:
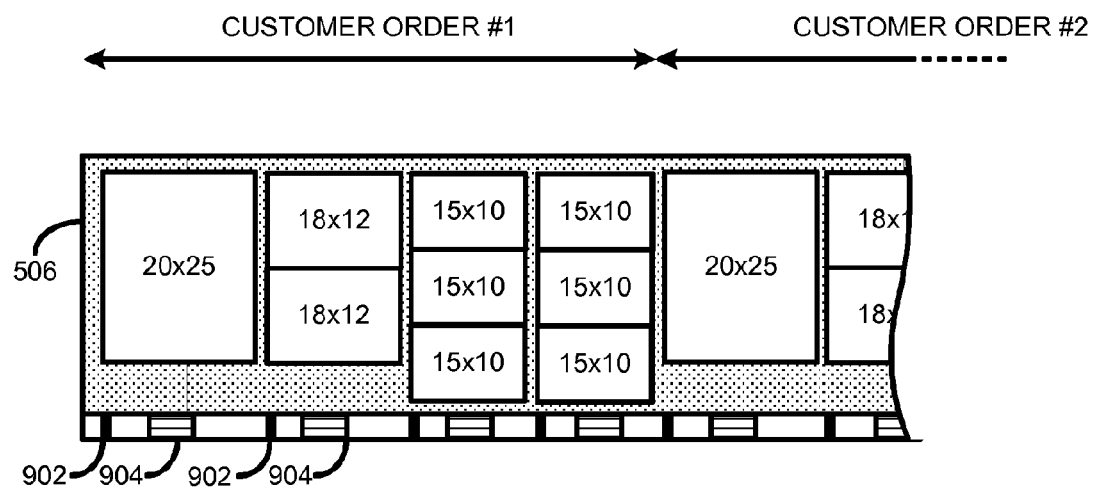
FIG. 9 shows an example image layout including cutter control marks according to one example.

As shown in FIG. 9 cutter control marks 902 and 904 are printed along one lateral edge of the web 506. In this example, cutter control marks 902 are 'eye marks' in the form of a solid shape having its front edge aligned with the front edge of each column of images. Such marks may be detected using suitable optical detection system (not shown) and be used to control the first cutter to precisely make the first cut to separate the front edge of the column of images from the web 506.

Cutter control marks 904 are used to identify the print size of images in each column of images. For example, cutter control mark 904 may be in the form of a bar code, a two dimensional bar code, may be optically recognizable text, or may be any other suitable kind of data-conveying mark.

In one example, the control of each of the first and second cutter may be controlled by a vision system (not shown) such as a scanner or video camera and an appropriate control module to precisely identify the location of each column of images and each image within each column at which cuts are to be made by the first and second cutters 508 and 512.

Figure 10:
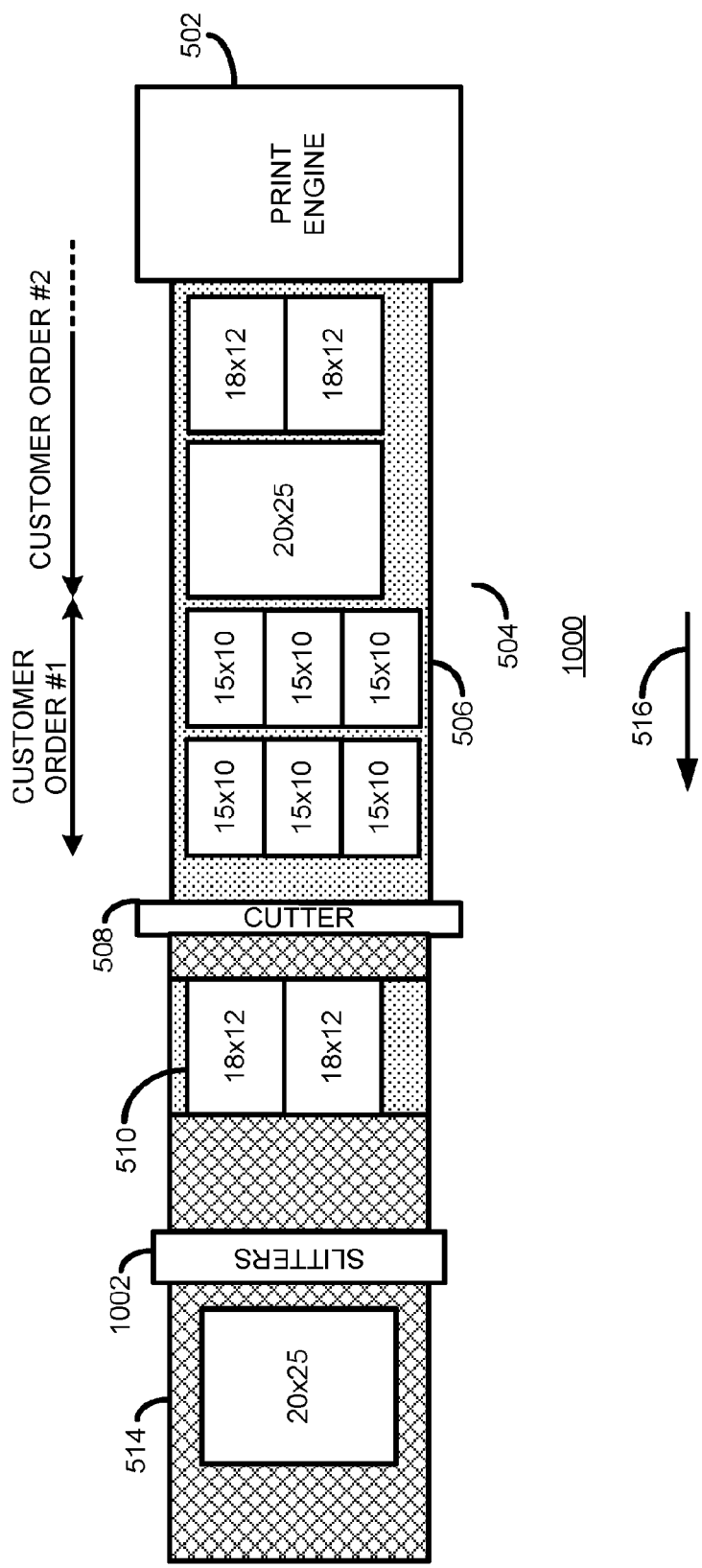
FIG. 10 shows a simplified illustration of a printing production environment according to one example.

In a yet further example, shown in FIG. 10, the printing production environment may be arranged in a linear manner, with the first cutter 508 aligned as previously described, and with a set of adjustable slitters 1002 replacing the second cutter. The adjustable slitters are arranged in the same alignment as the first cutter. The adjustable slitters 1002 comprise a set of position adjustable slitters that may be mechanically positioned to slit or cut individual images from each column of images. Each adjustable slitter may be, for example, a knife, a rotary cutter, or any other suitable cutting implement.

Figure 11:
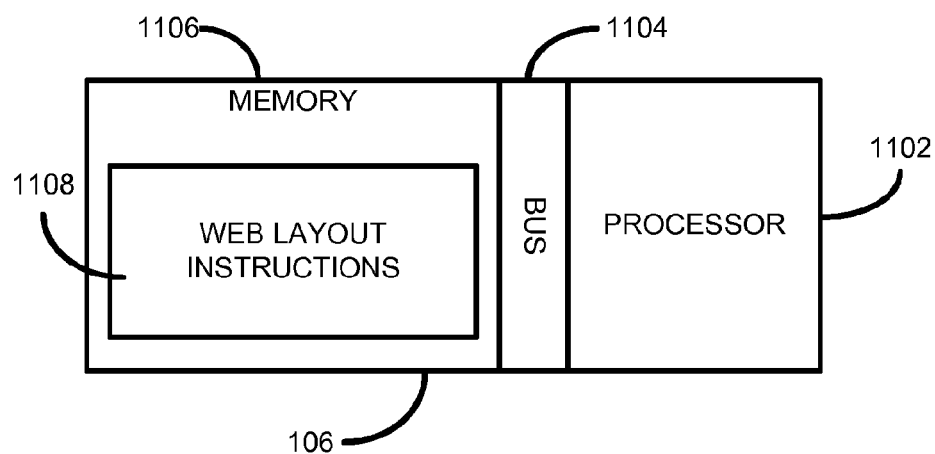
FIG. 11 is a block diagram of an implementation of a web layout module according to one example.

In one example, as shown in FIG. 11, the web layout module 106 comprises a processor 1102, such as a microprocessor or microcontroller, that is coupled to, and is in communication with, via a communications bus 1004, a memory 1106. The memory 1106 stores processor or computer understandable instructions 1108 that, when executed by the processor 1102, cause the processor 1102 to perform the method or methods of the web layout module described herein.

Examples described above are particularly advantage since all images of the customer order are printed by the same printing system all of the images are collated together in an efficient manner and in size order. In this way, the printed images are ready for manual or automated packaging and dispatch.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, examples provide a program comprising code for implementing a system or method as claimed in any preceding claim and a machine readable storage storing such a program.

All of the features disclosed in this specification (including any accompanying claims, abstract and drawings), and/ or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printing system comprising:
   a web layout module to:
   access a set of images, wherein images in a subset of the set of images have the same size with respect to the images in the subset and images outside of the subset have different sizes with respect to each other;
   generate a web layout of the accessed set of images, the web layout arranged in columns of same sized images, each column being arranged in sorted order of image size;
   add at least one of advertising material, a coupon, and customer information on a space of a column on which images do not extend a width of the web layout; and
   a print engine to print the set of images and the at least one of the advertising material, coupon, and customer information on a web of substrate in the generated print layout.

2. The printing system of claim 1, further comprising a first cutter to separate each printed column of images using one cut for each edge of the column of images.

3. The printing system of claim 1, further comprising a second cutter to separate each image from each separated column of images.

4. The printing system of claim 3, wherein the first cutter is aligned perpendicular to the web advance direction, and wherein the second cutter is align perpendicular to the first cutter.

5. The printing system of claim 3 wherein the print engine is controlled to print cutter control marks to enable the location of cuts to be made to be identified by each of the first and second cutters.

6. The printing system of claim 1, wherein the web layout module arranges the columns by descending size of the images in each column.

7. A method of printing a set of images comprising:
  printing the set of images on a web of substrate in columns, where images included in each column have the same print size and where columns are printed in a sorted order of print size;
  printing at least one of advertising material, a coupon, and customer information on the web of substrate in a space of a column on which images do not extend a width of the web;
  separating each column of images from the web using a first web cutter; and
  separating each image from each separated column of images using a second cutter aligned parallel to each image in each column of images.

8. The method of claim 7, wherein the first cutter is aligned parallel to each column of images.

9. The method of claim 7, wherein the second cutter is aligned perpendicular to the first cutter.

10. The method of claim 7, wherein each printed column of images is aligned perpendicular to the direction in which the web is advanced.

11. The method of claim 7, further comprising printing the columns in descending order of print size of the images in each column.

12. The method of claim 7, further comprising collating separated images from the printed set of images in descending size order.

13. The method of claim 7, further comprising removing waste from cutting operations.

14. The method of claim 7, further comprising determining the position at which to make each cut using one of: detection of cutter control marks printed on the web; a vision system to determine the position of each column of images and each image within each column.

15. A web layout apparatus comprising:
  a processor; and
  a memory on which is stored instructions that are to cause the processor to:
    access a set of images, wherein images in a subset of the set of images have the same size with respect to the images in the subset and images outside of the subset have different sizes with respect to each other;
    generate a web layout of the accessed set of images to be printed, the web layout arranged in columns of same sized images, each column being arranged in sorted order of image size; and
    add at least one of advertising material, a coupon, and customer information on a space of a column on which images do not extend a width of the web layout.

* * * * *